United States Patent [19]
von der Eltz et al.

[11] Patent Number: 5,542,972
[45] Date of Patent: Aug. 6, 1996

[54] REACTIVE DYES FOR INKJET PRINTING

[75] Inventors: Andreas von der Eltz, Frankfurt; Werner H. Russ, Flörsheim, both of Germany

[73] Assignee: Hoechst AG, Germany

[21] Appl. No.: 444,016

[22] Filed: May 18, 1995

[30] Foreign Application Priority Data

May 20, 1994 [DE] Germany .................. 44 17 718.6

[51] Int. Cl.$^6$ .................................. C09D 11/02
[52] U.S. Cl. .................. 106/22 H; 106/22 K; 106/22 D
[58] Field of Search ................ 106/22 H, 22 K, 106/22 D, 22 R

[56] References Cited

U.S. PATENT DOCUMENTS

| | | | |
|---|---|---|---|
| 4,421,601 | 12/1983 | Stephan et al. | 106/23 K |
| 4,622,391 | 12/1986 | Lorenz et al. | 106/23 D |
| 5,183,501 | 2/1993 | Kawashita et al. | 106/22 D |
| 5,290,923 | 3/1994 | Springer et al. | 534/642 |

FOREIGN PATENT DOCUMENTS

| | | |
|---|---|---|
| 481449 | 4/1992 | European Pat. Off. . |
| 42 10 568 | 10/1993 | Germany . |
| 9201755 | 2/1992 | WIPO . |

OTHER PUBLICATIONS

Smith, B., et al., "Ink Jet Printing for Textiles"; *Text. Chem. Color 19(8)*: pp. 23–29 (1987). (no month available).

Graham, L. A., "Ink Jet Systems for Dyeing and Printing of Textiles"; *Text. Chem. Color 21(6)*: pp. 27–32 (1989). (no month available).

*Primary Examiner*—Helene Klemanski
*Attorney, Agent, or Firm*—Connolly & Hutz

[57] ABSTRACT

Aqueous ink formulations consisting essentially of one or more reactive dyes whose reactive group contains a cyanamido group and an alkaline agent are notable for improved storage stability and are especially suitable for inkier printing.

6 Claims, No Drawings

REACTIVE DYES FOR INKJET PRINTING

The present invention relates to novel reactive dyes for inkjet printing.

Cellulose fiber textile materials such as woven fabrics, knitted fabrics, yarns and nonwovens are dyeable with anionic dyes by known methods. Of late this has come to mean not only by the conventional dyeing methods of printing, exhaust dyeing and padding but also by a modern spray technique which was first applied to paper under the name of inkjet printing but has recently also come to be used on textile materials.

The inkjet printing process is the only one of the non-contact printing processes which makes it possible to produce colored images rapidly, quietly and in high resolution. The process is usually carried out with aqueous inks, which are sprayed as small droplets directly onto the substrate. There is a continuous form of the process, in which the ink is pressed at a uniform rate through a nozzle and the jet is deflected onto the paper, or into an ink collector, by an electric field depending on the pattern to be printed, and there is an interrupted inkier or drop-on-demand process, in which the ink is expelled only where a colored dot is to appear, the latter form of the process using a piezoelectric crystal or a heated hollow needle (bubble or thermal jet process) to exert pressure on the ink system and so eject an ink droplet. These techniques are described in Text. Chem. Color. 19(8), 23 to 29, and 21(6), 27 to 32.

It is a common feature of all dyeing processes for cellulosic substrates that fixation of a reactive dye on the fiber requires alkali. The alkali is added before, after or during the dyeing process. Single-phase printing may use simultaneous application of alkali and dye. Subsequently a heat treatment, for example dry heat, steam or microwaves, is carried out to fix the dye. The alkali, for example NaOH or $Na_2CO_3$, can be directly added to the ink and it can subsequently be sprayed onto cellulosic fabric with an inkjet printer.

An aqueous ink formulation for the use in inkjet printers customarily comprises organic dyes, organic solvents, wetting agents and water. To obtain a good inkier print, the ink has to satisfy certain criteria as regards viscosity, surface tension, specific electrical conductivity, density and pH. These properties have to remain unchanged for a prolonged period to prevent troublesome precipitates in the cartridge or dramatic changes in viscosity and hence deterioration in the printout. Any kind of precipitation can lead to blockage of the nozzles, which are only 10 to 60 μm in size. Bubble jet printers, where the nozzle is heated, also require the inks to be thermally stable. Further criteria for inkier dyes are brilliance, hue, water fastness and light fastness. The ink dyes used are direct, acid and reactive dyes, for example C.I. Direct Black 17, 19, 22, 32, 51, 56, 62, 71, 74, 75, 77, 94, 105, 106, 107, 108, 112, 113, 117, 118, 122, 132, 133, 146, 154, 159, 162, 168, 169 and 173; C.I. Direct Blue 86, 87 and 199; C.I. Direct Red 9; C.I. Direct Yellow 86, 142 and 144; C.I. Acid Yellow 23, 42 and 49; C.I. Acid Red 14, 34, 35, 37 and 249; C.I. Acid Blue 7, 9 and 249; C.I. Reactive Red 24, 35, 111, 114, 174, 180 and 184; C.I. Food Black 2.

Ink formulations frequently include an alkaline standard in order to improve the wettability especially of paper. However, conventional reactive dyes vinylize even at room temperature under mild alkaline conditions and with time form precipitates in the cartridges, since the vinyl form of the reactive dyes is less soluble than, for example, the sulfate ester form.

The literature describes some ways of conferring greater stability in inkjet inks on reactive dyes. JP 123866/1989 discloses reactive dyes with an —$SO_2CH_2CH_2OH$— group for use in inkjet inks, while EP-A-0 481 449 discloses dyes with an —$SO_2CH_2CH_2SO_3H$— group which have a higher stability in the presence of an alkali but are no longer reactive.

It is the object of the present invention to provide ink formulations of reactive dyes with improved storage stability for inkier printing.

This object is achieved by the use of novel hydrolysis-stable reactive dyes as defined below. It was found that reactive dyes in the cyanamidoethylene sulfone form are surprisingly comparatively hydrolysis-stable and particularly suitable for ink formulations.

The present invention accordingly provides an aqueous ink formulation, especially for inkjet printing or for some other non-contact minimum addon spray technique, consisting essentially of a) one or more reactive dyes of the formula (I)

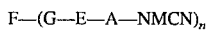
F—(G—E—A—NMCN)$_n$       (I), where
F is the radical of a monoazo, disazo or polyazo dye, of a heavy metal complex of said azo dyes, or of an anthraquinone, phthalocyanine, formazan, azomethine, dioxazine, phenazine, stilbene, triphenylmethane, xanthene, thioxanthene, nitronaryl, naphthoquinone, pyrenequinone or perylenetetracarbimide dye, G is a chemical bond, —$NR^1$—, where $R^1$ is hydrogen or $C_1$–$C_4$-alkyl, or a $C_1$–$C_8$-alkylene radical which can be interrupted by one or two groups of the formulae —O—, —NH— and —NH—$C_6H_4$— or a combination thereof, A is a chemical bond or a bivalent radical of the formula —$CH_2$—$CH_2$—, —$CH(CH_3)CH_2$—, —$CH_2CH(CH_3)$—, —$CH_2$—CHX—, CHX—$CH_2$—, —$CH(CH_3)$—CHX— or —CHX—$CH(CH_3)$—, where X is in each case Cl or Br, and E is a chemical bond or the bivalent radical —$SO_2$— or —CO—, or where G, E and A together are one or more, preferably 1 or 2, heterocyclic reactive groups Z of the class of the pyrimidines, triazines, quinoxalines, phthalazines, quinazolines, pyridazines, benzimidazoles, benzoxasoles or benzothiazoles which each contain 1 or 2 NMCN radicals, M is a hydrogen atom, an alkali or alkaline earth metal or an ammonium group, and n is from 1 to 4, preferably from 1 to 3, b) an alkaline agent, and c) further customary additives, preferably hydrotropic substances, antiaggregants, wetting agents, ionic or nonionic surfactants.

The reactivity of the cyanamidoethylene group is lower than that of the underlying ester form, but greater than that of the N-alkyl reactive groups. The cyanamidoethylens sulfone reactive dyes used according to the present invention are notable for very good solubility in the alkaline range. On acid papers the dissociation of the cyanamide is suppressed; it is predominantly present in the protonated and hence less soluble form. This effect additionally increases the adhesion of the dyes to cellulosic substrates.

The dyes used according to the present invention are customarily present in the form of their alkali metal salts, preferably as potassium, lithium and sodium salt, or else as ammonium salts, preferably those of ethanolamine and propanolamine.

The dyes underlying the radical F include for example: C.I. Reactive Yellow 13, 14, 15, 16, 17, 23, 24, 37, 42, 75, 76, 77, 79, 114, 115 and 116; C.I. Reactive Orange 7, 15, 16, 23, 24, 56, 72 and 113; C.I. Reactive Red 21, 22, 23, 34, 35, 36, 49, 50, 63, 64, 106, 108, 109, 110, 111, 112, 113, 114, 129 and 180; C.I. Reactive Violet 22; C.I. Reactive Brown 21; C.I. Reactive Blue 19, 20, 21, 27, 28, 37, 38, 77, 100, 101, 123, 147 and 148; C.I. Reactive Black 5 and 14.

The reactive dyes used according to the present invention are prepared by, for example, reacting a reactive dye in sulfuric ester form

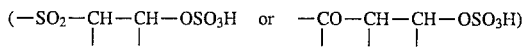

or in vinyl sulfone form

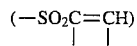

or containing a heterocyclic reactive group with cyanamide (NH$_2$CN) at temperatures from 30° to 85° C., preferably from 40° to 60° C., and a pH from 9 to 10 to form the corresponding cyanamidoethylene sulfones

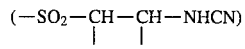

or cyanamidoethylene carbonyls

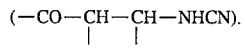

It is also possible to react the sulfuric ester form of customary reactive bases with cyanamide at temperatures from 30° to 85° C., preferably 40° to 60° C., and a pH from 9 to 10 and subsequently, by diazotization and azo coupling or acylation, to prepare the desired dye.

The molar ratios of any reactive group to be reacted to cyanamide range from 1:1 to 1:2, preferably 1:1.5 to 1:2.

In the case of reactive dyes with heterocyclic reactive groups, it is also possible for halogen atoms to be replaced by cyanamido radicals. In this constellation, the cyanamido radical brings about a better alkaline solubility. The modified heterocyclic reactive groups can be present alone or in combination with one or more vinylsulfonyl radicals on a dye chromophore. After the reaction the heterocyclic reactive groups are no longer reactive.

The dyes of the present invention dissociate above pH 8 and hence are readily water-soluble. In thin layer chromatography they are frequently difficult to distinguish from the respective vinyl forms, since their development behavior is not very different and the dyes do not run uniformly in the thin layer chromatogram because of the protonation equilibrium.

Fiber-reactive dyes which can be converted into the dyes according to the present invention are those organic dyes which contain 1, 2, 3 or 4 fiber-reactive radicals of the aliphatic, aromatic or heterocyclic series. These dyes are described in the literature in large numbers. They can belong to a wide range of dye classes, for example the class of the monoazo, disazo, polyazo and metal complex azo dyes, such as 1:1 copper, 1:2 chromium and 1:2 cobalt complex monoazo and disazo dyes, and also the series of the anthraquinone dyes, copper, nickel and cobalt phthalocyanine dyes, copper formazan dyes, azomethine, nitroaryl, dioxazine, triphendioxazine, phenazine and stilbene dyes. Fiber-reactive dyes are dyes with a "fiber-reactive" group, i.e. a group capable of reacting with the hydroxyl groups of the cellulose or with the amino and possibly carboxyl groups of polyamides to form covalent chemical bonds. The fiber-reactive radical can be bonded to the dye radical directly or via a bridge member; it is preferably bonded to the dye radical directly or via a possibly monoalkylated amino group, for example a group of the formula —NH—, —N(CH$_3$)—, —N(C$_2$H$_5$)— or —N(C$_3$H$_7$)—, or via an aliphatic radical, such as a methylene, ethylene or propylene radical or an alkylene radical of 2 to 8 carbon atoms which can be interrupted by one or two oxy and/or amino groups, or via an amino-containing bridge member, for example a phenylamino group.

Fiber-reactive radicals are for example: vinylsulfonyl, β-chloroethylsulfonyl, β-sulfatoethylsulfonyl, β-acetoxyethylsulfonyl, β-phosphatoethylsulfonyl, β-thiosulfatoethylsulfonyl, N-methyl-N-(β-sulfatoethylsulfonyl)amino, acryloyl, —CO—CCl=CH$_2$, —CO—CH=CH—Cl, —CO—CCl=CHCl, —CO—CCl=CH—CH$_3$, —CO—CBr=CH$_2$; —CO—CH=CH—Br, —CO—CBr=CH—CH$_3$, —CO—CCl=CH—COOH, —CO—CH=CCl—COOH, —CO—CBr=CH—COOH, —CO—CH=CBr—COOH, —CO—CCl=CCl—COOH, —CO—CBr=CBr—COOH, β-chloro- or β-bromopropionyl, 3-phenylsulfonylpropionyl, 3-methylsulfonylpropionyl, 3-chloro-3-phenylsulfonylpropionyl, 2,3-dichloropropionyl, 2,3-dibromopropionyl, 2-fluoro-2-chloro-3,3-difluorocyclobutane-2-carbonyl, 2,2,3,3-tetrafluorocyclobutane-1-carbonyl or-1-sulfonyl, β-(2,2,3,3-tetrafluorocyclobut-1-yl)acryloyl, α- or β-methylsulfonylacryloyl, propiolyl, chloroacetyl, bromoacetyl, 4-(β-chloroethylsulfonyl)butyril, 4-vinylsulfonylbutyryl, 5-(β-chloroethylsulfonyl)valeryl, 5-vinylsulfonylvaleryl, 6-(β-chloroethylsulfonyl)caproyl, 6-vinylsulfonylcaproyl, 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl, 2,4-dichlorotriazin-6-yl, 2,4-dichloropyrimidin- 6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-methylsulfonylpyrimidin- 6-yl, 2,5-dichloro-4-methylsulfonylpyrimidin-6-yl,2-fluoro-4-pyrimidinyl, 2,6-difluoro-4-pyrimidinyl, 2,6-difluoro-5-chloro-4-pyrimidinyl, 2-fluoro-5,6-dichloro- 4-pyrimidinyl, 2,6-difluoro-5-methyl-4-pyrimidinyl, 2,5-difluoro-6-methyl-4-pyrimidinyl, 2-fluoro-5-methyl- 6-chloro-4-pyrimidinyl, 2-fluoro-5-nitro-6-chloro-4-pyrimidinyl, 5-bromo-2-fluoro-4-pyrimidinyl, 2-fluoro-5-cyano- 4-pyrimidinyl, 2-fluoro-5-methyl-4-pyrimidinyl, 2,5,6-trifluoro-4-pyrimidinyl, 5-chloro-6-chloromethyl- 2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro- 5-nitro-4-pyrimidinyl, 2-fluoro-6-methyl-4-pyrimidinyl, 2-fluoro-5-chloro-6-methyl-4-pyrimidinyl, 2-fluoro-5-chloro- 4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl- 2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy- 4-pyrimidinyl, 2-fluoro-5-bromo-6-trifluoromethyl- 4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy- 4-pyrimidinyl, 2,6-difluoro-5-trifluoromethyl- 4-pyrimidinyl, 2,4-bis(methylsulfonyl)pyrimidin-4-yl, 2,5-bis(methylsulfonyl)-5-chloropyrimidin-4-yl, 2-methylsulfonyl pyrimidin-4-yl, 2-phenylsulfonylpyrimidin-4-yl, 2-methylsulfonyl-5-chloro-$_6$-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloromethylpyrimidin-4-yl, 2-methylsulfonyl- 5-nitromethylpyrimidin-4-yl, 2,5,6-trismethylsulfonylpyrimidin- 4-yl, 2-methylsulfonyl-5,6-dimethylpyrimidin- 4-yl, 2-ethylsulfonyl-5-chloro-6-methylpyrimidin- 4-yl, 2-methylsulfonyl-6-chloropyrimidin-4-yl, 2,6-bis(methylsulfonyl)-5-chloropyrimidin-4-yl, -methylsulfonyl-6-carboxypyrimidin-4-yl, 2-methylsulfonyl- 5-sulfopyrimidin-4-yl, 2-methylsulfonyl-6-carbomethoxypyrimidin- 4-yl, 2-methylsulfonyl-5-carboxypyrimidin- 4-yl, 2-methylsulfonyl-5-cyano-6-methoxypyrimidin- 4-yl, 2-methylsulfonyl-5-chloropyrimidin-4-yl, 2-sulfoethylsulfonyl-6-methylpyrimidin-4-yl, 2-methylsulfonyl- 5-bromopyrimidin-4-yl, 2-phenylsulfonyl- 5-chloropyrimidin-4-yl, 2-carboxymethylsulfonyl-5-chloro- 6-methylpyrimidin-4-yl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine- 5-carbonyl, 2,4,6-trichloropyrimidine- 5-carbonyl, 2,4-dichloropyrimidine-5-sulfonyl, 2,4-dichloro-6-methylpyrimidine-5-carbonyl or -5-sulfonyl, 2-methylsulfonyl-6-chloropyrimidine-4- and -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)pyrimidine-5-sulfonyl, 2-methylsulfonyl- 4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxaline- 6-sulfonyl, 2,3-dichloroquinoxaline-5- or -6-carbonyl, 2,3-dichloroquinoxaline-5- or -6-sulfonyl, 1,4-dichlorophthalazine-6-sulfonyl or -6-carbonyl, 2,4 -dichloroquinazoline-7- or -6-sulfonyl or -carbonyl, 2,4,6-trichloroquinazoline-7- or -8-sulfonyl, 2- or 3- or 4-(4',5'-dichloropyridaz-6'-on-1'-yl)phenylsulfonyl or -carbonyl, β-(4',5'-dichloropyridaz-6'-on-1'-yl)propionyl, 3,6-dichloropyridazine-4-carbonyl or -4-sulfonyl, 2-chlorobenzothiazole-5- or -6-carbonyl or -5- or -6-sulfonyl, 2-arylsulfonyl- or 2-alkylsulfonylbenzothiazole-5- or -6-carbonyl or -5- or -6-sulfonyl, such as 2-methylsulfonyl- or 2-ethylsulfonylbenzothiazole-5- or -6-sulfonyl or -carbonyl, 2-phenylsulfonylbenzothiazole-5- or -6-sulfonyl or -carbonyl and the corresponding 2-sulfonylbenzothiazole- 5- or -6-carbonyl or -sulfonyl derivatives with sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methylthiazole(1,3)-5-carbonyl or -4- or -5-sulfonyl, ammonium-containing triazine rings, such as 2-trimethylammonium-4-phenylamino- and -4-(o-, m- or p-sulfophenyl)amino-6-triazinyl, 2-(1,1-dimethylhydrazinium)- 4-phenylamino- and -4-(o-, m- or p-sulfophenyl)amino- 6-triazinyl, 2-(2-isopropylidene-1,1-dimethyl) hydrazinium- 4-phenylamino- and -4-(o-, m- or p-sulfophenyl)amino- 6-triazinyl, 2-N-aminopyrrolidinium-, 2-N-aminopiperidinium- 4-phenylamino- or -4-(o-, m- or p-sulfophenyl)-amino- 6-triazinyl, 4-phenylamino- or 4-(sulfophenylamino)-6 -triazinyl which contains 1,4-bisazabicyclo[2.2.2]octane or 1,2-bisazabicyclo [0.3.3 ]octane bonded in quaternary fashion in the 2-position via a nitrogen bond, 2-pyridinium-4-phenylamino- or -4-(o-, m- or p-sulfophenyl)amino- 6-triazinyl and corresponding 2-onium-6-triazinyl radicals which are substituted in the 4-position by alkylamino, such as methylamino, ethylamino or β-hydroxyethylamino, or alkoxy, such as methoxy or ethoxy, or aryloxy, such as phenoxy or sulfophenoxy.

The materials printed by the process of the present invention are papers which may have been cationically coated or treated.

The alkaline agent used is preferably sodium hydroxide solution, sodium carbonate, sodium bicarbonate, triethanolamine and triethylamine.

The ink formulations of the present invention include the reactive dye in a concentration of from 1 to 10% by weight, preferably 2 to 6% by weight, and the alkaline agent in such an amount as to produce a pH from 8 to 10, preferably 8 to 9.

The dye solutions can include assistants as customarily present, if necessary, in the inks for inkier printers, for example antiaggregants, such as N-methylpyrrolidone, dimethylformamide and dimethylacetamide; wetting agents, such as ionic or nonionic surfactants and hydrotropic substances, such as urea, caprolactam, glycol, diethylene glycol, polyethylene glycol or a glycol monoalkyl ether.

The ink formulation is applied to the paper with the aid of commercial inkier printers. The reactive dyes are used in the form free of electrolyte salts, such as sodium chloride. But even commercial dye preparations with up to 50% by weight of electrolyte salt can typically be applied without problems by the inkjet printing technique in the process according to the present invention.

In the examples which follow, all dyes are depicted in the form of the free acid, i.e. in the protonated form. Percentages are by weight.

EXAMPLE 1

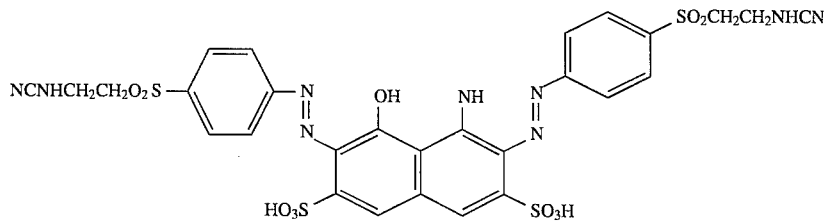

To 200 g of commercial C.I. Reactive Black 5 are added 8.4 g of cyanamide in 1000 g of water and the mixture is heated to 60° C. The pH of the solution is adjusted with 2N NaOH to pH 9.5 to 10. Following a reaction time of 30 to 60 minutes, the reaction has ended. The end point of the reaction can be monitored by thin layer chromatography and HPLC. The dye can easily be salted out with 10% of NaCl and further processed isolated or in solution. To prepare an ink formulation, the solution is made up with water to about 2.5 l, and the result is a solution which, following addition of organic solvents and wetting agents, is directly usable as an ink. However, advantageously, these ink solutions are first rendered salt-free with a membrane desalter, since excessively high electrolyte concentrations tend to crystallize out and chloride ions corrode the jets.

The ink solution contains

| Dye of Example 1 | 6% |
|---|---|
| Diethylene glycol | 10% |
| N-Methylpyrrolidone | 2% |
| Water | 80% |
| Triethanolamine | 2% |

EXAMPLE 2

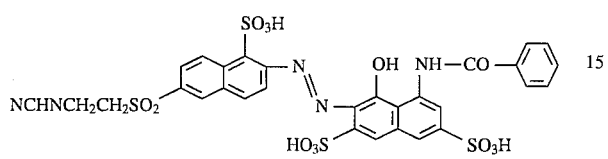

To 183 g of commercial red dye known from EP-A-0 158 223, Example 3, are added 4.2 g of cyanamide in 1000 g of water and the mixture is heated to 60° C. The pH of the solution is adjusted with 2N NaOH to pH 9.5 to 10. Following a reaction time of 30 to 60 minutes, the reaction has ended. The end point of the reaction can be monitored by thin layer chromatography and HPLC. The dye can easily be salted out with 10% of NaCl and further processed isolated or in solution.

An ink solution preparable with the dye of the present invention contains for example Dye of Example 2 5%

Diethylene glycol 10%

N-Methylpyrrolidone 2%

Triethanolamine 2%

Water 81%.

EXAMPLE 3

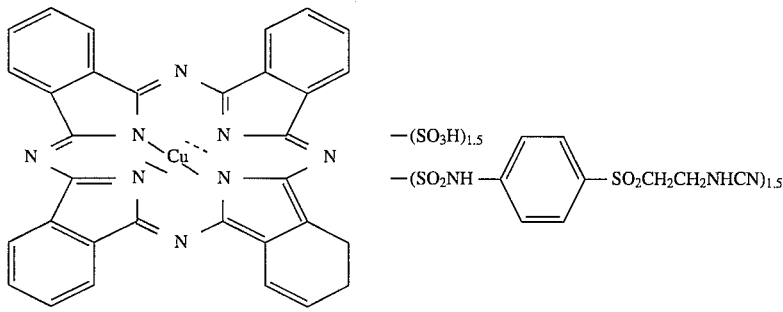

To 250 g of commercial turquoise dye known from DE-A-1 179 317, Example 2, are added 8.4 g of cyanamide in 1000 g of water and the mixture is heated to 60° C. The pH of the solution is adjusted with 2N NaOH to pH 9.5 to 10. Following a reaction time of 30 to 60 minutes, the reaction has ended. The end point of the reaction can be monitored by thin layer chromatography and HPLC. The dye can easily be salted out with 5 to 10% of NaCl and further processed isolated or in solution. For use in inkjet inks, a membrane desalting is advisable here too.

The ink solution contains

| Dye of Example 3 | 6% |
|---|---|
| Diethylene glycol | 10% |
| N-Methylpyrrolidone | 2% |
| Triethanolamine | 4% |
| Water | 78%. |

EXAMPLE 4

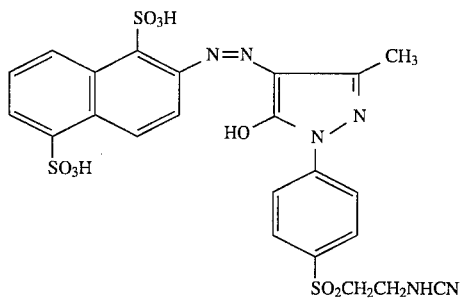

To 125 g of commercial yellow dye known as C.I. Reactive Yellow 37 are added 4.2 g of cyanamide in 1000 g of water and the mixture is heated to 60° C. The pH of the solution is adjusted with 2N NaOH to pH 9.5 to 10. Following a reaction time of 30 to 60 minutes, the reaction has ended. The end point of the reaction can be monitored by thin layer chromatography and HPLC. The dye can easily be salted out with 10% of NaCl and further processed isolated or in solution.

The ink solution contains

| Dye of Example 4 | 5% |
|---|---|
| Diethylene glycol | 10% |
| N-Methylpyrrolidone | 2% |
| Triethanolamine | 4% |
| Water | 79%. |

In the examples which follow the pH of the ink solution is in each case pH 8 to 9.

EXAMPLE 5

| Dye of Example 1 | 5% |
|---|---|
| Diethylene glycol | 10% |
| N-Methylpyrrolidone | 2% |

-continued

| | |
|---|---|
| Triethanolamine | 5% |
| Water | 78%. |

EXAMPLE 6

| | |
|---|---|
| Dye of Example 1 | 5% |
| Diethylene glycol | 8% |
| Polyethylene glycol | 3% |
| Sodium bicarbonate | 0.1% |
| Water | 83.9%. |

EXAMPLE 7

| | |
|---|---|
| Dye of Example 1 | 5% |
| Thiodiglycol | 8% |
| Polyethylene glycol | 3% |
| Triethylamine | 5% |
| Water | 79%. |

EXAMPLE 8

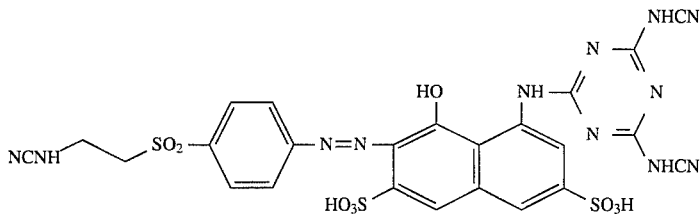

1 mol of a dye known from JP 63/23287, Example 1, was reacted with 6 mol of cyanamide at a temperature of 60° C. and pH 10. Following a reaction time of 1 to 2 hours, the reaction has ended. The end point of the reaction can be monitored by thin layer chromatography and HPLC. The dye can be salted out with 10% of NaCl.

To prepare an ink formulation, the procedure of Example 1 according to the present invention is followed.

EXAMPLE 9

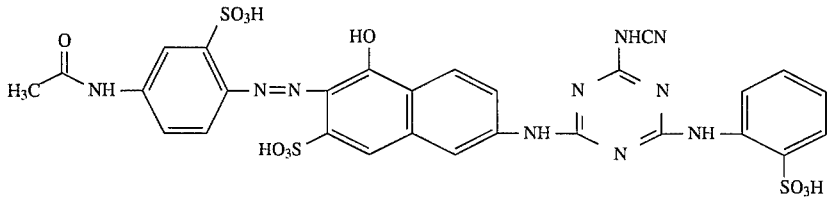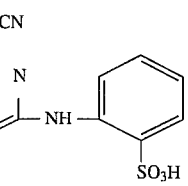

1 mol of the dye known from Chem. Abstr. 14826-60-9 was reacted with 1.5 mol of cyanamide as described in Example 8. Ink formulations were prepared as per Example 5, 6 and 7.

What is claimed is:

1. An aqueous ink formulation consisting essentially of
a) one or more reactive dyes of the formula (I)

$$F-(G-E-A-NMCN)_n \qquad (I)$$

where

F is the radical of a monoazo, disazo or polyazo dye, of a heavy metal complex of said azo dyes, or of an anthraquinone, phthalocyanine, formazan, azomethine, dioxazine, phenazine, stilbene, triphenyimethane, xanthene, thioxanthene, nitroaryl, naphthoquinone, pyrenequinone or perylenetetracarbimide dye, G is a chemical bond, $-NR^1-$ where $R^1$ is hydrogen or $C_1$-$C_4$-alkyl, or a $C_1$-$C_8$-alkylene radical which is optionally interrupted by one or two groups of the formulae $-O-$, $-NH-$ and $-NH-C_6H_4-$ or a combination thereof, A is a chemical bond or a bivalent radical of the formula $-CH_2-CH_2-$, $-CH(CH_3)CH_2-$, $-CH_2CH(CH_3)-$, $-CH_2-CHX-$, $-CHX-CH_2-$, $-CH(CH_3)-CHX-$ or $-CHX-CH(CH_3)-$, where X is in each case Cl or Br, and E is a chemical bond or the bivalent radical $-SO_2-$ or $-CO-$, or where G, E and A together are one or more heterocyclic reactive groups Z of the class of the pyrimidines, triazines, quinoxalines, phthalazines, quinazolines, pyridazines, benzimidazoles, benzoxazoles or benzothiazoles which each contain 1 or 2 NMCN radicals, M is a hydrogen atom, an alkali or alkaline earth metal or an ammonium group, and n is from 1 to 4, b) an alkaline agent, and c) optionally further customary additives.

2. The ink formulation of claim 1 including the reactive dye in a concentration of from 1 to 10% by weight.

3. The ink formulation of claim 1 including the reactive dye in a concentration of from 2 to 6% by weight.

4. The ink formulation of claim 1 including an alkaline agent in such an amount as to produce a pH from 8 to 10.

5. The ink formulation of claim 1 including an alkaline agent in such an amount as to produce a pH from 8 to 9.

6. The method of inkjet printing a paper material comprising the step of inkjet printing with an aqueous ink formulation as claimed in claim 1.

* * * * *